US008219489B2

(12) United States Patent
Patterson

(10) Patent No.: US 8,219,489 B2
(45) Date of Patent: Jul. 10, 2012

(54) TRANSACTION PROCESSING USING A GLOBAL UNIQUE IDENTIFIER

(75) Inventor: Barbara Elizabeth Patterson, South San Francisco, CA (US)

(73) Assignee: Visa U.S.A. Inc., San Francisco, CA (US)

(*) Notice: Subject to any disclaimer, the term of this patent is extended or adjusted under 35 U.S.C. 154(b) by 640 days.

(21) Appl. No.: 12/182,032

(22) Filed: Jul. 29, 2008

(65) Prior Publication Data

US 2010/0030688 A1 Feb. 4, 2010

(51) Int. Cl.
*G06Q 40/00* (2012.01)

(52) U.S. Cl. ............ 705/44; 705/1; 705/14; 705/14.17; 705/26; 705/30; 705/39; 705/40; 705/64; 705/78

(58) Field of Classification Search .............. 705/1, 14, 705/14.17, 26, 30, 39, 40, 64, 78
See application file for complete search history.

(56) References Cited

U.S. PATENT DOCUMENTS

| 5,465,206 | A | 11/1995 | Hilt et al. |
|---|---|---|---|
| 5,477,038 | A | 12/1995 | Levine et al. |
| 5,500,513 | A | 3/1996 | Langhans et al. |
| 5,621,201 | A | 4/1997 | Langhans et al. |
| 6,226,624 | B1 | 5/2001 | Watson et al. |
| 6,247,129 | B1 | 6/2001 | Keathley et al. |
| 6,535,726 | B1 | 3/2003 | Johnson |
| 6,560,581 | B1 | 5/2003 | Fox et al. |
| 6,837,425 | B2 | 1/2005 | Gauthier et al. |
| 6,868,391 | B1 | 3/2005 | Hultgren |
| 6,920,611 | B1 | 7/2005 | Spaeth et al. |
| 7,007,840 | B2 | 3/2006 | Davis |
| 7,039,611 | B2 | 5/2006 | Devine |
| 7,051,923 | B2 | 5/2006 | Nguyen et al. |
| 7,104,446 | B2 | 9/2006 | Bortolin et al. |
| 7,121,456 | B2 | 10/2006 | Spaeth et al. |
| 7,124,937 | B2 | 10/2006 | Myers et al. |
| 7,152,780 | B2 | 12/2006 | Gauthier et al. |
| 7,243,853 | B1 | 7/2007 | Levy et al. |

(Continued)

FOREIGN PATENT DOCUMENTS

KR 1998-072136 A 10/1998

(Continued)

OTHER PUBLICATIONS

Office Action of Aug. 5, 2010 in related U.S. Appl. No. 12/205,112.

(Continued)

*Primary Examiner* — James Trammell
*Assistant Examiner* — Sanjeev Malhotra
(74) *Attorney, Agent, or Firm* — Kilpatrick Townsend & Stockton LLP

(57) ABSTRACT

A Globally Unique IDentifier (GUID) is used to match an authorization request with an authorization response for a transaction between a merchant and a consumer upon an account within a payment processing system where the payment amount is unknown until after the merchant receives the authorization response that includes the GUID. After receiving the authorization response and when the payment amount is known, the merchant forms a transmission that has information for delivery to an issuer of the account. This information is sufficient for the issuer to forward the payment amount from the account to pay the merchant for the transaction. While including the GUID and the payment amount, the information does not include an identifier of the account.

25 Claims, 5 Drawing Sheets

U.S. PATENT DOCUMENTS

| | | |
|---|---|---|
| 7,280,981 B2 | 10/2007 | Huang et al. |
| 7,350,702 B2 | 4/2008 | Bortolin et al. |
| 7,356,516 B2 | 4/2008 | Richey et al. |
| D568,388 S | 5/2008 | Hammad |
| D568,389 S | 5/2008 | Hammad |
| D568,390 S | 5/2008 | Law et al. |
| D569,424 S | 5/2008 | Law et al. |
| D569,425 S | 5/2008 | Law et al. |
| 7,367,501 B2 | 5/2008 | Bortolin et al. |
| D571,399 S | 6/2008 | Hammad et al. |
| D571,855 S | 6/2008 | Law et al. |
| D571,856 S | 6/2008 | Hammad et al. |
| 7,389,275 B2 | 6/2008 | Kemper et al. |
| D572,752 S | 7/2008 | Hammad |
| D573,181 S | 7/2008 | Hammad |
| D575,815 S | 8/2008 | Hammad et al. |
| D575,816 S | 8/2008 | Law et al. |
| 7,407,094 B2 | 8/2008 | Myers et al. |
| D576,207 S | 9/2008 | Hammad et al. |
| 7,427,021 B2 | 9/2008 | Kemper et al. |
| D578,158 S | 10/2008 | Hammad et al. |
| D580,974 S | 11/2008 | Hammad |
| 7,464,870 B2 | 12/2008 | Nguyen et al. |
| D584,769 S | 1/2009 | Hammad |
| 7,482,925 B2 | 1/2009 | Hammad et al. |
| D590,875 S | 4/2009 | Law et al. |
| 7,522,905 B2 | 4/2009 | Hammad et al. |
| D592,244 S | 5/2009 | Hammad |
| D593,151 S | 5/2009 | Hammad |
| D593,152 S | 5/2009 | Hammad et al. |
| 7,527,208 B2 | 5/2009 | Hammad et al. |
| 7,567,920 B2 | 7/2009 | Hammad et al. |
| 7,571,141 B2 | 8/2009 | Huang et al. |
| 7,591,412 B2 | 9/2009 | Spaeth et al. |
| 7,600,670 B2 | 10/2009 | Gauthier et al. |
| 7,611,054 B2 | 11/2009 | Bortolin et al. |
| 7,624,917 B2 | 12/2009 | Spaeth et al. |
| 7,627,522 B2 | 12/2009 | Monk |
| 7,653,602 B2 | 1/2010 | Davis |
| 7,654,451 B2 | 2/2010 | Bortolin et al. |
| 7,657,441 B2 | 2/2010 | Richey et al. |
| 7,668,785 B1 | 2/2010 | Hammad |
| 7,690,560 B2 | 4/2010 | Gauthier et al. |
| 7,694,287 B2 | 4/2010 | Singh et al. |
| 7,702,916 B2 | 4/2010 | Seaton, Jr. et al. |
| 7,711,621 B2 | 5/2010 | Huang et al. |
| 7,711,639 B2 | 5/2010 | Reid et al. |
| 7,725,369 B2 | 5/2010 | Shiftan et al. |
| 7,725,394 B2 | 5/2010 | Lal et al. |
| 7,726,561 B2 | 6/2010 | Katyal et al. |
| 7,739,169 B2 | 6/2010 | Hammad |
| 7,740,168 B2 | 6/2010 | Hammad et al. |
| 7,742,986 B2 | 6/2010 | Steele et al. |
| 7,769,599 B2 | 8/2010 | Yanak et al. |
| 7,774,402 B2 | 8/2010 | Singh et al. |
| 7,783,564 B2 | 8/2010 | Mullen et al. |
| 7,792,688 B2 | 9/2010 | Yanak et al. |
| 7,793,837 B1 | 9/2010 | Faith et al. |
| 7,809,637 B2 | 10/2010 | Monk |
| 7,809,650 B2 | 10/2010 | Bruesewitz et al. |
| 7,810,165 B2 | 10/2010 | Hammad et al. |
| 7,818,264 B2 | 10/2010 | Hammad |
| 7,819,322 B2 | 10/2010 | Hammad et al. |
| 7,822,679 B1 | 10/2010 | Vaux et al. |
| 7,827,077 B2 | 11/2010 | Shiftan et al. |
| 7,840,459 B1 | 11/2010 | Loftesness et al. |
| 2001/0044787 A1 | 11/2001 | Shwartz et al. |
| 2002/0087344 A1* | 7/2002 | Billings et al. ............. 705/1 |
| 2002/0111919 A1 | 8/2002 | Weller et al. |
| 2002/0120582 A1* | 8/2002 | Elston et al. ............. 705/64 |
| 2002/0138445 A1 | 9/2002 | Laage et al. |
| 2003/0023524 A1 | 1/2003 | Sugimoto et al. |
| 2003/0200184 A1* | 10/2003 | Dominguez et al. ............. 705/78 |
| 2004/0117300 A1 | 6/2004 | Jones et al. |
| 2004/0153650 A1 | 8/2004 | Hillmer |
| 2004/0230525 A1 | 11/2004 | Barsade et al. |
| 2005/0033686 A1 | 2/2005 | Peart et al. |
| 2005/0119972 A1* | 6/2005 | Inglis ............. 705/40 |
| 2005/0131826 A1 | 6/2005 | Cook |
| 2005/0240531 A1 | 10/2005 | Wolff |
| 2006/0253390 A1 | 11/2006 | McCarthy et al. |
| 2007/0055597 A1 | 3/2007 | Patel et al. |
| 2007/0055630 A1 | 3/2007 | Gauthier et al. |
| 2008/0021821 A1 | 1/2008 | Katyal et al. |
| 2008/0052182 A1* | 2/2008 | Marshall ............. 705/26 |
| 2008/0059306 A1* | 3/2008 | Fordyce et al. ............. 705/14 |
| 2008/0086420 A1 | 4/2008 | Gilder et al. |
| 2008/0133350 A1* | 6/2008 | White et al. ............. 705/14 |
| 2008/0249937 A1 | 10/2008 | Walls et al. |
| 2008/0300973 A1* | 12/2008 | DeWitt et al. ............. 705/14 |
| 2009/0070171 A1 | 3/2009 | Patterson |
| 2009/0076938 A1 | 3/2009 | Patterson |
| 2009/0112757 A1* | 4/2009 | Hammad et al. ............. 705/39 |
| 2009/0182654 A1* | 7/2009 | Mullen et al. ............. 705/30 |
| 2010/0169170 A1* | 7/2010 | Fordyce et al. ............. 705/14.17 |

FOREIGN PATENT DOCUMENTS

| | | |
|---|---|---|
| KR | 10-0299010 | 10/2001 |
| KR | 10-2001-0094823 | 11/2001 |
| KR | 2002-0013621 A | 2/2002 |
| KR | 10-2004-0002035 | 1/2004 |

OTHER PUBLICATIONS

Office Action of Jan. 19, 2011 in related U.S. Appl. No. 12/205,112.

Search/Examination Report dated Nov. 26, 2009 from International Application No. PCT/US2008/075694, 13 pages.

* cited by examiner

TRANSACTION PROCESSING USING A GLOBAL UNIQUE IDENTIFIER

FIELD

Implementations generally relate to processing of transactions, and more particularly, to processing transactions within a payment processing system, and most particularly to processing transactions upon a corresponding account within a payment processing system using Globally Unique IDentifier (GUID) that is associated with the transaction.

BACKGROUND

Multiple activities are involved in processing a transaction between a consumer and a merchant for a product or service that is payable upon an account issued to the consumer by an issuer within a payment processing system. Typically, processing of the transaction involves an authorization activity followed by a clearing and settlement activity (collectively "remittance"). Clearing includes the exchange of financial information between the issuer and an acquirer of the merchant and settlement includes the transfer of funds.

Referring to FIG. 1, a cross-functional flow chart depicts an exemplary method of authorizing and remitting a transaction using an account identifier of the account. When the merchant and the consumer engage in the transaction, the consumer may give the merchant the account identifier (e.g., the account number) of a corresponding account of the consumer upon which the transaction is to be made payable. The account identifier is then used throughout both the authorization and the remittance of the transaction to distinguish the transaction from among many of the transactions.

At a step 102, the merchant may transmit to the issuer, via an acquirer, an authorization request including the account identifier and a quantity of funds to be authorized by the issuer. The acquirer forwards the authorization request to a transaction handler who in turn forwards the authorization request to the issuer. At step 106, the issuer verifies whether the account identifier is valid or whether the balance of the account corresponding with the account identifier can cover the quantity of funds. The issuer forms, for forwarding to the merchant, an authorization response to the authorization request including the account identifier. Depending on the response to the authorization request, the merchant may release the good and/or service to the consumer or decline releasing of the good or service to the consumer at a step 110.

Several verifications can occur during the authorization. For instance, the issuer may verify (i) the integrity of the account; (ii) an available balance of the account as greater than or equal to the payment (e.g., the quantity of funds to be authorized by the issuer); (iii) that the account is an account that the issuer issued to the consumer; or (iv) a combination of the forgoing. The transaction handler may evaluate the authorization request to determine if the authorization request is populated according to predetermined standards, or the transaction handler may verify that the account is part of a loyalty program within the payment processing system. The acquirer may verify that the acquirer is associated with the merchant. Moreover, a risk analysis may be done on the account to determine a likelihood that there will be a successful clearing and settling of the payment from the account based on features of the account such as: the category of the account (e.g., gold card versus platinum card), the geographical location of the branch of the issuer where the account was first opened, a past transaction history of the account including a rate at which multiple past remittances were successfully conducted, or a combination thereof.

Similarly, during remittance, the account identifier is used to route the payment to the merchant and to match the payment with the corresponding authorization. At a step 114, the merchant may batch multiple clearing and settling requests of multiple transactions into one transmission, wherein each clearing and settling request in the batch is associated with a corresponding account identifier. The transmission for the batch is submitted by the merchant to its acquirer who in turn forwards the batch to the transaction handler. The acquirer or the transaction handler use the account identifier to sort the transactions within the batch based on each corresponding payment processing system of the account (e.g., Visa, MasterCard, or American Express). At a step 116, the transaction handler uses the account identifier of each corresponding clearing and settling request within the received batch to determine which issuer should receive the corresponding clearing and setting request.

At a step 118, the issuer receives the corresponding clearing and settling requests each including a corresponding account identifier. For each clearing and settling request, the issuer withdraws the payment from the account corresponding to the account identifier and forwards the payment to an issuer clearing bank. At a step 120, the issuer clearing bank forwards the payment associated with the account identifier to a transaction handler settlement bank. At a step 122, the transaction handler settlement bank forwards the payment associated with the account identifier to an acquirer settlement bank. At a step 124, the acquirer settlement bank forwards the payment associated with the account identifier to the acquirer. At a step 126, the acquirer makes the payment associated with the account identifier available to the merchant. Finally, at a step 128, the merchant receives the payment and uses the associated account identifier to balance the accounting of the transaction, such as by matching the payment with a corresponding authorization response from among a plurality of authorization responses.

Other steps that the transaction handler, or other entities within the payment processing system, may conduct during remittance include: adjudicating the final quantity of funds, determining how the payment can be transferred from the issuer to the acquirer, evaluating fees that may apply in transferring the funds, applying a foreign-to-domestic currency conversion, if applicable, or a combination thereof.

Reliance on the account identifier, in whole or in part, to distinguish the transaction from among the plurality of transactions within the payment processing system exposes the corresponding consumer to risks. For example, the merchant may locally store a plurality of the account identifiers for later submission of corresponding clearing and settling requests. Storing the account identifier of a corresponding consumer may pose risks to the corresponding consumer such as when unauthorized access to the stored account identifier leads to theft, fraud, or credit damage.

The foregoing points out a need to provide secure processing of authorization and remittance of transactions payable upon the account within the payment processing system.

SUMMARY

In one implementation, a computer implemented method is disclosed wherein a transaction between a merchant and a consumer upon an account issued to the consumer by an issuer within a payment processing system is processed using a Globally Unique IDentifier ("GUID") that is associated with the transaction. The GUID is unique within the payment processing system such that the GUID is unique among multiple of the GUIDs each associated with a corresponding transaction. An authorization request for the transaction is received having: a preliminary quantity of funds to be authorized for the transaction by the issuer; a code for the transaction that is unique among a plurality of said transactions of the merchant; and an account identifier of a corresponding account. The GUID is associated with the transaction. A first transmission is formed having information for delivery to the issuer and usable to form an authorization response responding to the authorization request for the transaction, wherein the information includes the GUID. The authorization response of the issuer is received, including the GUID but not the account identifier of the account. The authorization response is associated with the authorization request by, at least, matching the GUID associated the transaction, with the GUID received in the authorization response.

A second transmission containing information for delivery to the merchant is formed, wherein the information does not including the account identifier but includes: the authorization response; the GUID; and the code for the transaction. A third transmission is received including: the GUID; and a final quantity of funds for the transaction. A fourth transmission is received having information for delivery to the issuer and usable to forward the final quantity of funds for the transaction from the account to pay the merchant for the transaction.

In another implementation, a payment processing system comprises a merchant and a consumer engaging in a transaction that has been authorized with an authorization by an issuer as being payable upon an account issued to the consumer by the issuer within the payment processing system. The account is associated with an account identifier. A payment amount of the transaction is unknown until after the merchant receives the authorization from the issuer. After receiving the authorization, the merchant submits to the payment processing system at least: the payment amount, and an associated Globally Unique IDentifier (GUID) that is unique within the payment processing system and is independent of the account identifier, whereby the transaction is distinguished by the GUID from a plurality of the transactions within the payment processing system. Subsequent to receiving the authorization from the issuer, the merchant does not submit the account identifier to the acquirer or the transaction handler.

In yet another implementation, an authorization request for the transaction is formed having: a preliminary quantity of funds to be authorized for the transaction by the issuer; a code for the transaction that is unique among a plurality of the transactions of the merchant; and an account identifier of the account. An authorization response of the issuer is received responding to the authorization request and not including the account identifier, but including the code for the transaction and the GUID. The GUID received in the response is associated with the transaction by, at least, matching the code for the transaction in the authorization request with the code for the transaction received in the authorization response. When the response includes an indication that the transaction has been authorized: the good or the service is released to the consumer; and a transmission is formed including: the GUID, and a final quantity of funds for the transaction that is to be the payment for the transaction from the account, wherein the transmission does not include the account identifier. A notification is received indicating that the payment amount from the account has been forwarded to the acquirer.

BRIEF DESCRIPTION OF THE DRAWINGS

Implementations will become more apparent from the detailed description set forth below when taken in conjunction with the drawings, in which like elements bear like reference numerals.

DETAILED DESCRIPTION

Processing of a payment between a consumer and a merchant for a transaction is addressed in various exemplary implementations described for a payment processing system. Within the payment processing system, a transaction handler processes a transaction characterized by the consumer and the merchant engaging in the transaction upon an account that has been issued to the consumer by an issuer. The account may be a credit, a prepaid, a debit, a line of credit, a deposit, or a loan account, for example. Alternatively, or in combination, the account may be a flexible spending account or a health savings account. The merchant may be a retailer, a wholesaler, a reseller, a manufacturer, or a distributor, for example. If the merchant is engaged in a transaction to sell to another merchant, then the latter is deemed to be a consumer.

Figure 1:
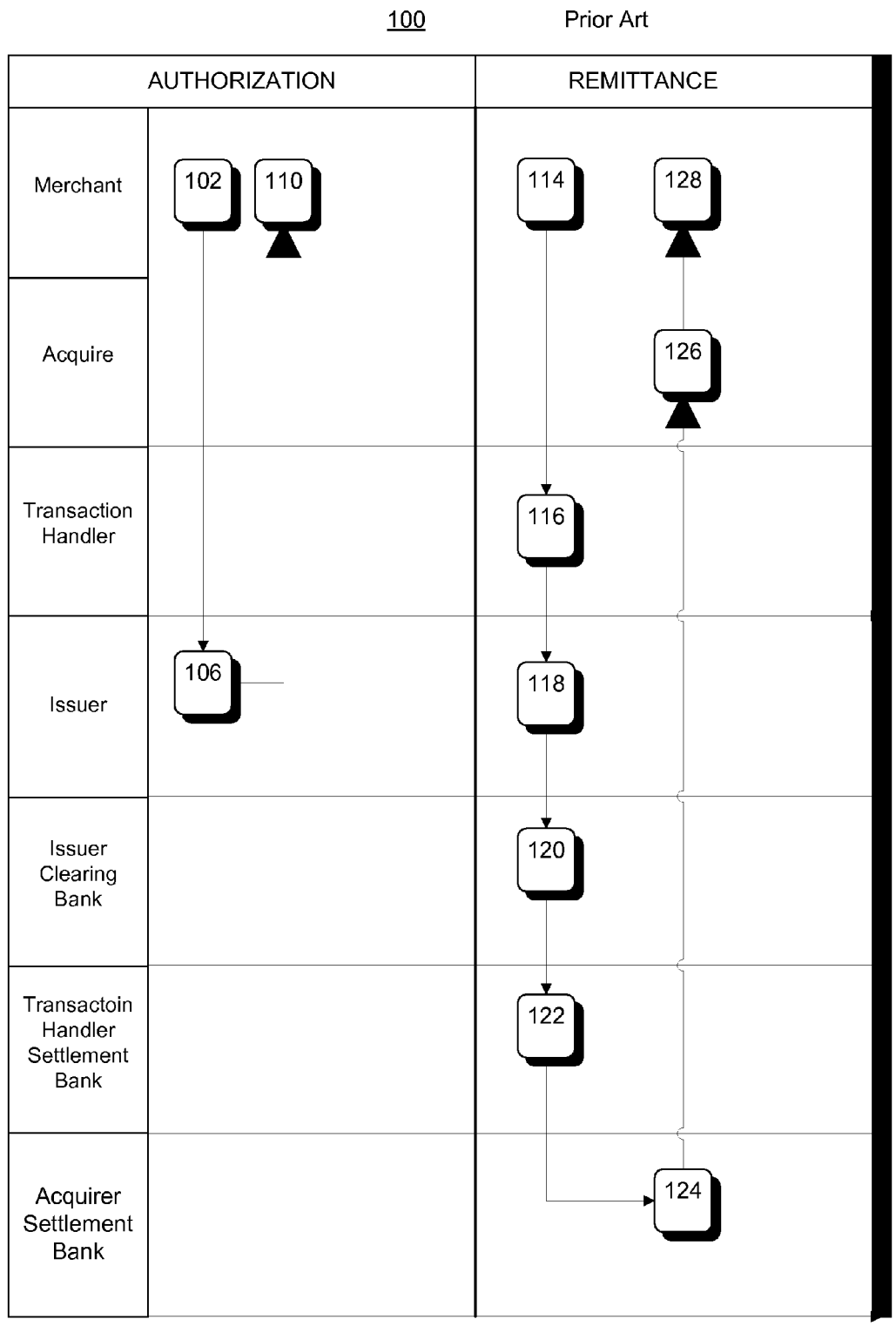
FIG. 1 depicts a cross-functional flow chart illustrating an exemplary prior art process for authorizing and remitting a transaction using a corresponding account identifier.
Figure 2:
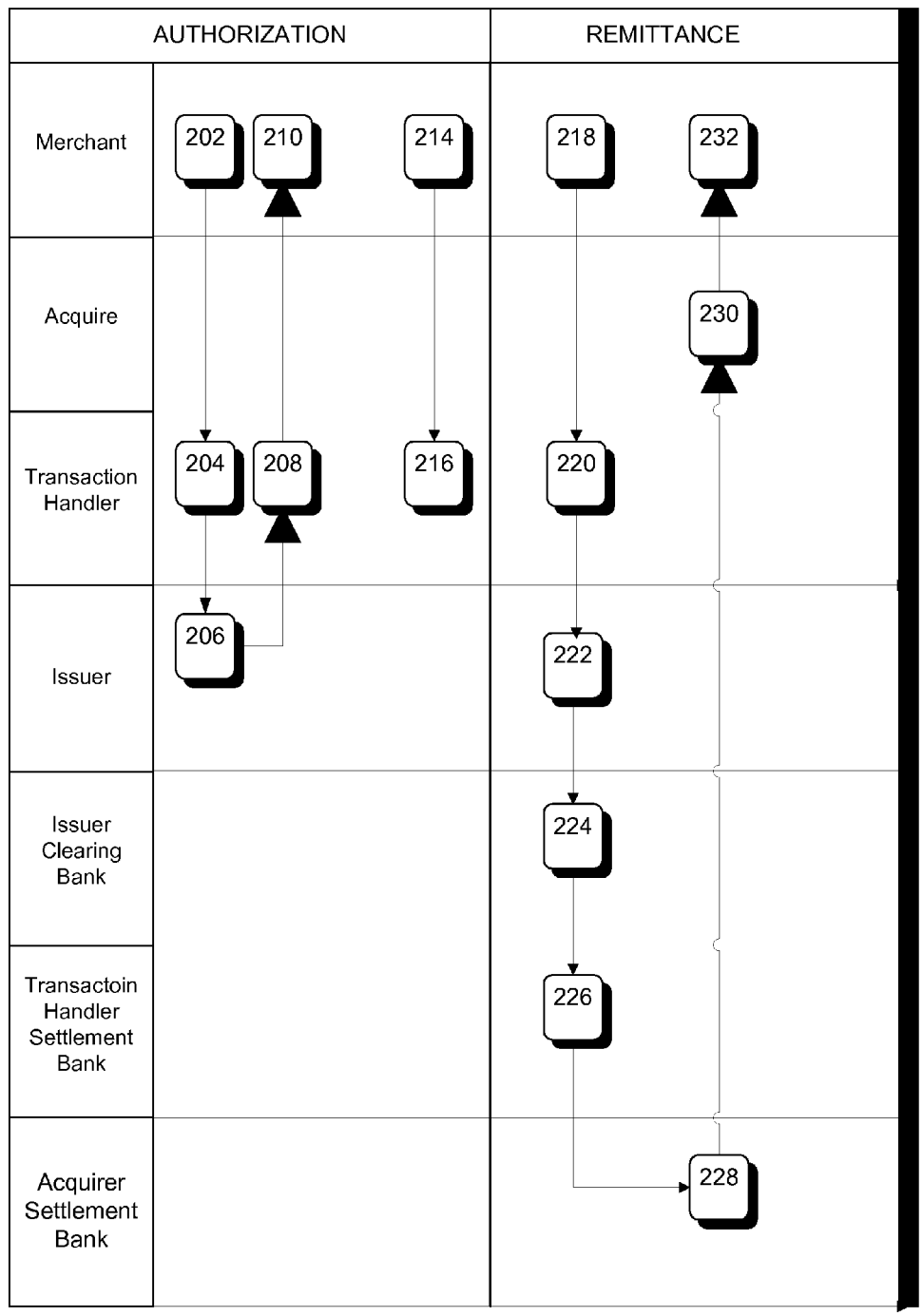
FIG. 2 depicts a cross-functional flow chart illustrating an exemplary implementation in which a Globally Unique Identifier (GUID) is used in both authorization and remittance of a transaction, wherein a final quantity of funds to pay for the transaction is unknown until after the authorization.

Referring to FIG. 2, a cross-functional flow chart depicts an exemplary implementation in which a Globally Unique IDentifier ("GUID") is used in both authorization and remittance of a transaction within a payment processing system. At a step 202, a merchant may obtain an account identifier for an account from a consumer prior to legally transferring goods or services of a transaction to the consumer. The merchant may submit an authorization request that includes the account identifier and a preliminary quantity of funds to be authorized to a transaction handler via the merchant's acquirer.

At a step 204, the transaction handler may receive the authorization request and derive the GUID. The GUID will be unique within the payment processing system. As such, the GUID that is associated with the transaction will be unique among all such GUIDs, where each GUID is associated with one transaction of one merchant among many such transactions of many such merchants. The GUID may be independent of the account identifier such that the GUID is not derived using the account identifier. For example, the GUID can be generated using a combination of a date of the transaction and either a sequential number or a number that is generated by using a pseudo random number generator.

The transaction handler associates the transaction with the GUID. For example, the transaction handler may store indicia about the transaction along with the corresponding GUID in a database. Thereafter, the GUID, rather than the account identifier, can be included in transmissions during the processing of the corresponding transaction within the payment processing system (e.g., authorization, remittance, chargeback, representment, adjustment, or clearing or settling of money from sponsors towards a loyalty program). To illustrate, the transaction handler may form a transmission including the GUID and a request to refund a payment of a consumer from the merchant back to the account when the consumer returns the good or service purchased during the transaction. In another example, the merchant may sponsor a loyalty program in which the consumer receives an incentive (e.g., a credit shown on an account statement) if the transaction of the consumer satisfies a criterion of the loyalty program, such as using a credit card to pay for Sears® brand hand tools. Sears may form a transmission addressed to the transaction handler, where the transmission includes the GUID associated with the transaction that satisfies the criterion and also includes a request that money be transferred from Sears to the issuer in an amount equal to a value of the incentive.

At a step 206, the issuer forms an authorization response to the authorization request, such as a verification that the account is valid. The authorization response is addressed to the transaction handler and includes the GUID but not the account identifier. At step 208, the transaction handler matches the GUID, which was received from the issuer in the authorization response, with the GUID that is associated with the transaction. For example, the transaction handler may match the GUID received in the authorization response with the GUID that is stored in the database along with other information that is related to the corresponding transaction. The transaction handler forms a transmission addressed to the merchant via the acquirer that includes the authorization response and the GUID, but not the account identifier. At a step 210, the merchant may determine whether to legally transfer the goods or services of the transaction to the consumer based on the authorization response. Thereafter, the merchant may store the GUID instead of, or in place of, the account identifier for use as a tag in subsequent processing of the transaction. At a step 214, the merchant may transmit a final quantity of funds along with the GUID to the transaction handler. At a step 216, the transaction handler can match the received GUID in the transmission, that also includes the final quantity of funds, with the GUID associated with the transaction in order to associate the final quantity of funds with the corresponding transaction. For example, the transaction handler may store the final quantity of funds in the database in association with the corresponding transaction.

The preliminary quantity of funds may be different from the final quantity of funds because the final quantity of funds may be uncertain at the time of submission of the authorization request. The final quantity of funds required to pay for all costs in a transaction may be a function of a variable, such as a quantity of time that a service is rendered to a consumer. For example, when a hotel patron first checks into a hotel, the hotel patron may begin a transaction by giving a corresponding account identifier to a hotel operator. The hotel operator may submit an authorization request with an estimate of a cost for a hotel stay of the hotel patron receiving an authorization response that includes a corresponding GUID. When the hotel patron checks out of the hotel, the hotel operator can determine all costs involved in the hotel stay and submit the corresponding GUID along with a corresponding final quantity of funds for the hotel stay in a transmission to the transaction handler via a corresponding acquirer.

Other examples of merchants conducting transaction for which the final quantity of funds is unknown at the time of authorization are as follows: a restaurant requiring an account number to hold a reservation for a dining transaction, a manufacturer requiring an account number before beginning a manufacturing process of unknown cost, a gas station who allows a motorist to begin fueling an automobile without knowing in advance the amount of fuel to be purchase, or a car rental company providing a motorist with a car without knowing in advance the length of the rental period. To illustrate and expand upon these examples, a diner may wish to pay a bill for a meal with a credit card. The waiter may submit an authorization request in an amount of the bill plus an estimated tip of fifteen percent (15%) of the bill, in response to which the waiter receives a credit card slip bearing only the amount of the bill. The credit card slip can then be presented to the diner who adds only ten percent (10%) of the amount of the bill, not the previously estimated 15%, as a tip for the waiter. Similarly, a retailer may order from a manufacturer "enough widgets" to produce a new line of products. The manufacturer may transmit the authorization request for an estimate of the final quantity of funds. Thereafter, the manufacturer may receive a purchase order including a quantity for the widgets and the final quantity of funds corresponding to the quantity of widgets purchased. In yet another example, a motorist may be purchasing fuel upon an account for a motor vehicle for which the quantity of fuel to be pumped into the tank of the vehicle is unknown at the time that the motorist's purchase is being authorized by a gas station. The gas station may form the authorization request with an estimate of the final quantity of funds that is pre-determined by the gas station or is otherwise derived based on queries to the motorist (e.g., "How much fuel will you be purchasing today?"). Similarly, vehicle rental providers may rent a vehicle to a driver and submit an authorization request without knowing, in advance, how long and for what mileage the driver will be renting the vehicle. The vehicle rental provider will submit the final quantity of funds to the transaction handler after the vehicle has been returned by the motorist at which time both the duration of the rental and the mileage will be known.

Alternatively, or in combination, the preliminary quantity of funds may be different from the final quantity of funds because the authorization request is submitted only to check the integrity of the account rather than to obtain an indication that there is an available balance to cover the as yet unknown final quantity of funds for the transaction. For example, a nominal value, such as one dollar ($1 US) may be submitted in the authorization request to test, via an authorization response of the issuer to the authorization request, whether the account is valid.

At a step 218, the merchant forms a transmission including a clearing and settlement request along with the associated GUID of the corresponding transaction, but not the corresponding account identifier. At a step 220, the transaction handler can match the GUID, which was received in the clearing and settling request from the merchant, with the GUID associated with the transaction and log that the clearing and settling request for the transaction has been received. Once the corresponding transaction is identified, the transaction handler can send the clearing and settling request along with the GUID to the corresponding issuer in order to have the payment transferred to the merchant. At a step 222, the issuer can match the GUID received in the clearing and settling request with the corresponding transaction, such as matching the GUID in the clearing and settlement request received from the transaction handler with the GUID in the corresponding authorization response of the issuer. The issuer can withdraw the payment from the account of the consumer and forward the payment associated with the GUID to the issuer clearing bank.

At a step 224, the issuer clearing bank forwards the payment associated with the GUID to the transaction handler settlement bank. At a step 226, the transaction handler settlement bank forwards the payment associated with the GUID to the acquirer settlement bank. At a step 228, the acquirer settlement bank forwards the payment associated with the GUID to the acquirer. At a step 230, the acquirer makes the payment associated with the GUID available to the merchant. Finally, at a step 232, the merchant receives the payment. The merchant can use the associated GUID to balance the merchant's internal accounting processes as they pertain to the corresponding transaction, such as by matching the payment with a corresponding authorization response from among a plurality of such authorization responses.

Consequently, each entity within the payment processing system, such as the acquirer, can use the GUID to distinguish the transaction being processed from other transactions without relying, in whole or in part, on the account identifier. In this manner, neither the merchant, the acquirer, the transaction handler, the issuer clearing bank, the transaction handler settlement bank, the acquirer settlement bank, nor any third party agent thereof (e.g., a processor) would need to rely on the account identifier to distinguish the transaction. The benefit thereby realized is that opportunities for fraud inherent in uses of the account identifier are reduced by uses of a GUID in place of the account identifier.

Figure 3:
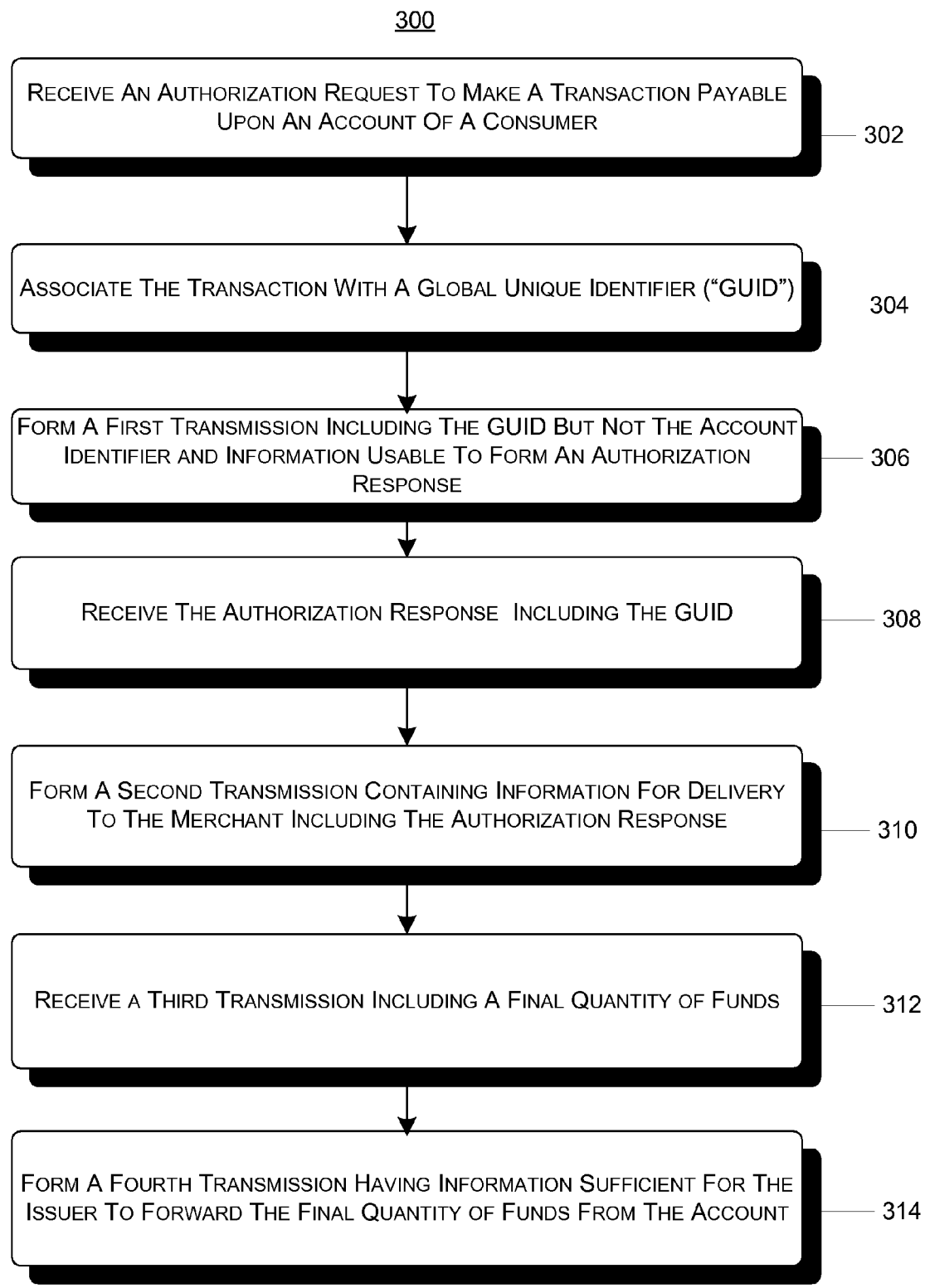
FIG. 3 depicts a flow chart of an exemplary method for authorizing, clearing and settling a transaction using a GUID, wherein a final quantity of funds to pay for the transaction is unknown until after the authorization.

Referring to FIG. 3, a flow chart of an exemplary method 300 for authorizing, clearing, and settling a transaction using a GUID is illustrated, wherein a final amount of a payment for the transaction is unknown at the time that a merchant receives a corresponding authorization response from an issuer. At a step 302, an authorization request for the transaction is received. The merchant may submit the authorization request to the acquirer for forwarding to the transaction handler. The authorization request may include a preliminary quantity of funds to be authorized for the transaction by the issuer, a code for the transaction that is unique among a plurality of the transactions of the merchant, and the account identifier. For example, the consumer may present the account identifier of the account to the merchant at a Point Of Service (POS) terminal of the merchant toward the purchase of a shipment of coffee beans. The merchant may form a transmission that includes one hundred dollars ($100.00 US) as the preliminary quantity of funds to be authorized for the transaction and the character string '4234567890123456' as the account identifier. The authorization request for the purchase of the shipment of coffee beans may also have, as the code for the transaction: the date on which the authorization request was formed; the time the authorization request was formed; a merchant identifier of the merchant; and a logical address corresponding to the location of the POS terminal. Alternatively, the merchant may create the code for the transaction using a pseudo random number generator.

The code for the transaction will preferably be unique among all of the transactions that the merchant may be engaged in, but not be unique across merchants within the payment processing system. For example, a first merchant may have a coding system wherein sequential unique numbers are assigned to each successive transaction that the first merchant is engaged in (e.g., 1, 2, 3, 4, 5, . . . 100). Similarly, a second merchant may have another coding system wherein sequential unique numbers are assigned to each successive transaction that the second merchant is engaged in (e.g., 5, 10, 15, 20 . . . 100). Consequently, both the first and the second merchants may form respective authorization requests each having the number "5" as the code for the transaction.

At a step 304, the transaction is associated with the GUID that is unique within the payment processing system across a plurality of the merchants. For example, an algorithm may be used to derive the GUID as a function of one of the parameters of the transaction, such as the merchant identifier for the merchant, the date of the transaction, a geographical indicator of the merchant (e.g., a ZIP code), or a combination thereof. The GUID will preferably be derived without relying on the account identifier such that the GUID is independent of the account identifier. For example, the GUID may be independent of the account identifier when an algorithm derives the GUID without having a corresponding account identifier of the corresponding transaction as an input to the algorithm. Alternatively, or in combination, the GUID can be derived using a pseudo random number generator.

At a step 306, a first transmission is formed having the corresponding GUID of the transaction, but not the account identifier, and information usable to form the authorization response to the authorization request for the transaction. The first transmission may include the authorization request or components thereof. For example, the transaction handler may form the first transmission for delivery to the issuer having the GUID, the preliminary quantity of funds to be authorized for the transaction by the issuer, the merchant identifier of the merchant, the account identifier of the account, and the date of the transaction. The transaction handler may forward the authorization request without including the code for the transaction of the merchant (e.g., "5" in the example above), but including the GUID for the issuer to include in future transmissions back to the transaction handler regarding the transaction. The issuer, for example, may validate that the account is authentic or that the issuer issued the account to the consumer. The issuer or the transaction handler may conduct a risk analysis on the account to determine the level of risk in authorizing the transaction.

At a step 308, the authorization response of the issuer to the authorization request for the transaction is received. The authorization response of the issuer may include the GUID rather than the account identifier. As stated previously, the transaction handler may have stored in a database information pertaining to each of a plurality of such transactions and their corresponding GUIDs. The transaction handler may match the GUID received in the authorization response with a corresponding GUID stored in the database. In this manner, the transaction handler is thereby able to distinguish each transaction from other such transactions, and is also able to associate, within the database, the authorization response with the corresponding transaction.

At a step 310, a second transmission is formed so as to contain information for delivery to the merchant. This information will include all or part of the authorization response of the issuer. The second transmission includes the GUID, but not the account identifier. The merchant may associate the GUID in the authorization response with the transaction. For example, the merchant may store in a merchant database the GUID and information about the transaction. Depending on the authorization response, the merchant may transfer the good or service that is being purchased to the consumer, which transfer will be prior to the merchant being able to know the final quantity of funds for the transaction.

At a step 312, a third transmission is received that will include the final quantity of funds for the transaction. Once the final quantity of funds for the transaction is known, the merchant may submit the final quantity of funds along with the GUID associated with the transaction to the payment processing system, such as to the transaction handler via the merchant's acquirer. The transaction handler may utilize the GUID to associate the final quantity of funds received from the merchant with the corresponding transaction that may be stored in the database.

The submission of the final quantity of funds along with the GUID from the merchant may be in a remittance request from the merchant. Alternatively, the remittance request may be formed in a separate transmission including the GUID, wherein the transaction handler may utilize the GUID to match the remittance request with the indicia of the transaction stored in the database.

At a step 314, a fourth transmission is formed having information usable by the issuer to forward the payment such that the merchant may get paid for the transaction. For example, the transaction handler may form the fourth transmission addressed to the issuer and including a request that the issuer transfer the payment having a value equal to the final quantity of funds from the account to the merchant. The transaction handler settlement bank can deposit the payment into the acquirer settlement bank. The corresponding acquirer can withdraw the payment of the transaction from the acquirer settlement bank.

The final quantity of funds may be converted to a different currency value through the use of a foreign-to-domestic currency exchange rate. For example, a purchase made in English Pounds may be converted to a United States Dollar amount. The currency exchange rate may be date dependent wherein the value of the rate may change from one date to another. If the authorization, the clearing, and the settling occur in a window of time having a single exchange rate, then the preliminary quantity of funds being authorized may match the final quantity of funds.

Figure 4:
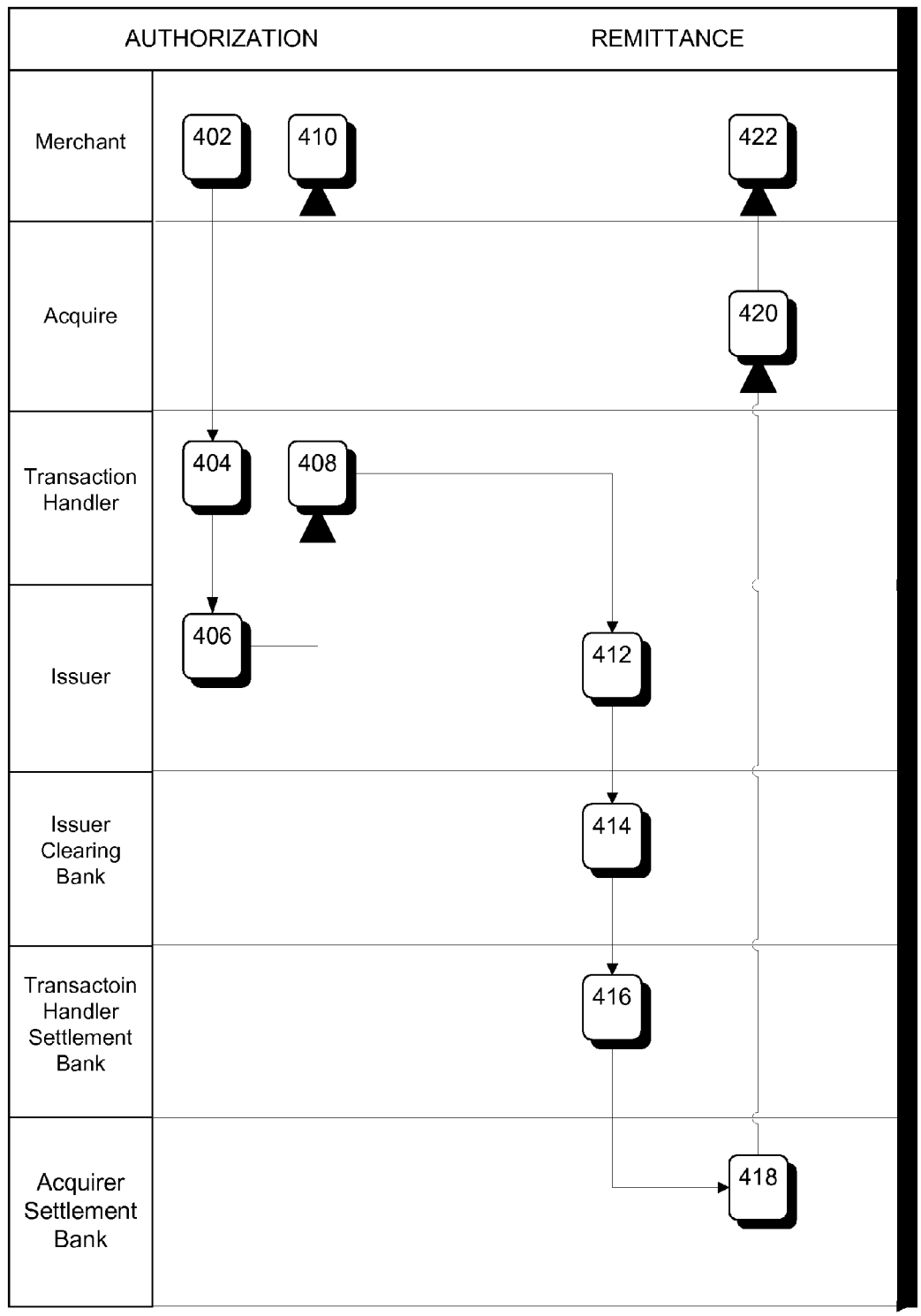
FIG. 4 depicts a cross-functional flow chart illustrating an exemplary implementation in which a merchant submits a single message request to initiate both authorization and remittance of a transaction.

Referring to FIG. 4, a cross functional flow chart illustrates an exemplary implementation in which the merchant submits a single message request to initiate both the authorization and the remittance of the transaction, using the GUID. At a step 402, the merchant may submit the single message request including the account indicator and the merchant identifier to the transaction handler via the acquirer. If the final quantity of funds is known at the time of formation of the single message request, the final quantity of funds may also be included in the single message request. At a step 404, the transaction handler may derive the GUID for the transaction and forward the GUID, along with an authorization request for the transaction, to the issuer. At a step 406, the issuer forms the authorization response and transmits it to the transaction handler along with the GUID. At a step 408, the transaction handler forwards the authorization response and the GUID, but not the account identifier, to the merchant via the acquirer. At a step 410, if the transaction is authorized by the issuer, the merchant may legally transfer the good or service to the consumer who is making the purchase.

At the step 408, the transaction handler may initiate the clearing and settling of the transaction without the merchant submitting a separate request to do so. The transaction handler may form a remittance transmission so as to contain sufficient information for the issuer to forward the payment to the merchant. The transaction handler may augment the single message request received from the merchant when forming the remittance transmission. For example, the single message request may not have a ZIP code for an address of the merchant that submitted the single message request. However, given the merchant identifier received in the single message request, the transaction handler may determine the ZIP code of the address of the merchant so that the ZIP code can be included in the remittance transmission to the issuer.

At a step 412, the issuer forwards the payment associated with the GUID to the issuer clearing bank that forwards the payment associated with the GUID to the transaction handler settlement bank at a step 414. At a step 416, the transaction handler settlement bank forwards the payment associated with the GUID to the acquirer settlement bank who in turn forwards the payment associated with the GUID to the merchant's acquirer at a step 418. At a step 420, the merchant's acquirer gives the merchant access to the payment associated with the GUID. At a step 422, the merchant may balance its accounting of the transaction by matching the GUID received in the authorization response with the GUID received with the payment. Consequently, after the merchant submits the single message request, both the authorization and the remittance of the transaction are processed within the payment processing system using the GUID.

The Payment Processing System

Figure 5:
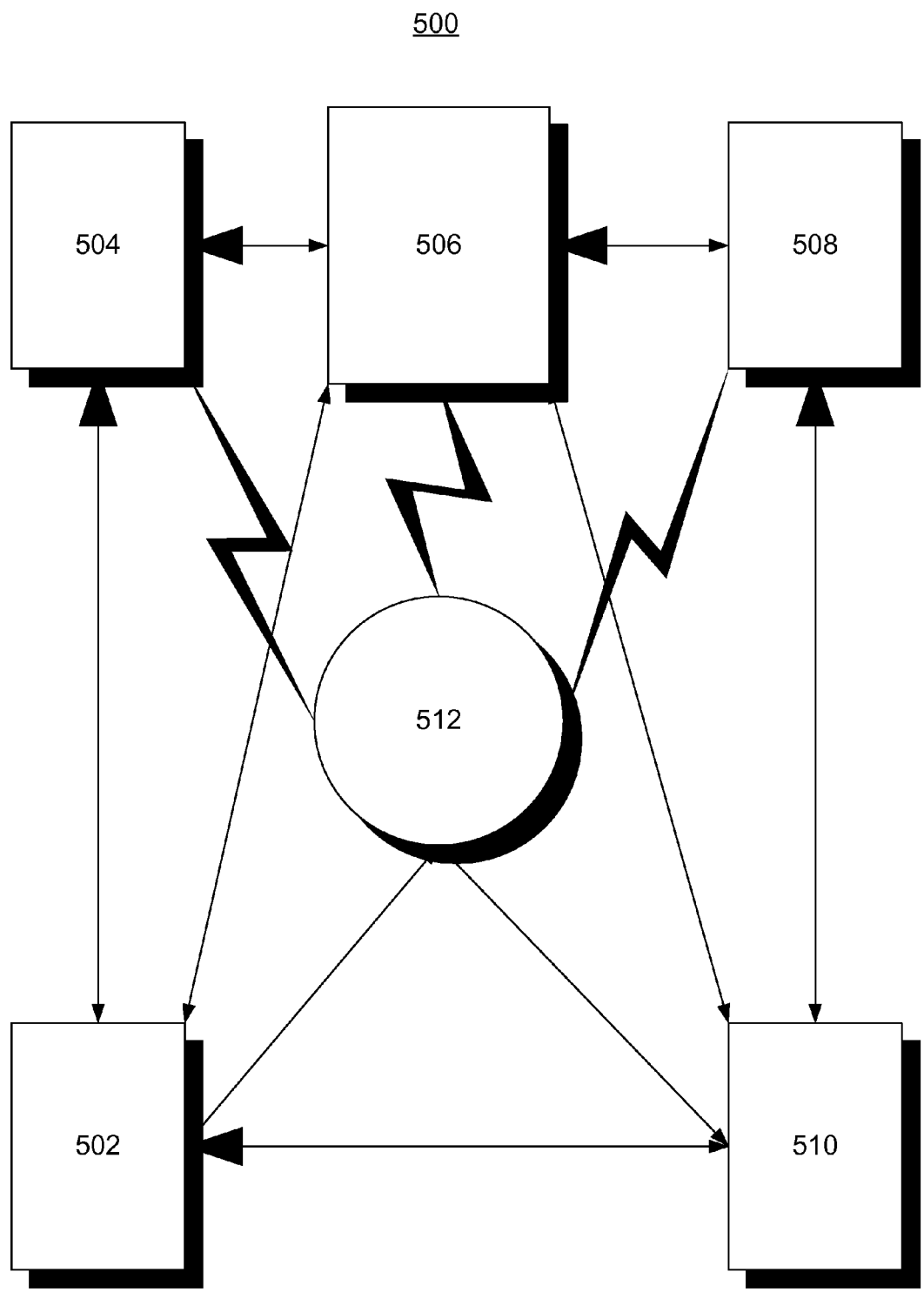
FIG. 5 depicts a block diagram of an exemplary payment processing system.

As background information for the foregoing description of a transaction in a payment processing system, as will be readily understood by persons of ordinary skill in payment processing systems, the transaction in the payment processing system can include participation from different entities that are each a component of the payment processing system. An exemplary payment processing system is depicted in FIG. 5 as a payment processing system 500. The payment processing system 500 includes an issuer 504 such as the issuer; a transaction handler 506, such as the transaction handler; an acquirer 508 such as the acquirer; a merchant 510 such as the merchant; and a consumer 502 such as the consumer. The acquirer 508 and the issuer 504 can communicate through the transaction handler 506. The merchant 510 may utilize at least one of the POS terminals that can communicate with the acquirer 508, the transaction handler 506, or the issuer 504. Thus, the POS is in operative communication with the payment processing system 500.

Typically, the transaction begins with the consumer 502 presenting a corresponding account identifier of the account such as through the use of a computer terminal or a portable consumer device 512 to the merchant 510 to initiate an exchange for a good or service. The consumer 502 may be an individual or a corporate entity. The consumer 502 may be an account holder of the account issued by the issuer 504 such as a joint account holder of the account or a person having access to the account such as an employee of a corporate entity having access to a corporate account. The portable consumer device 512 may include a payment card, a gift card, a smartcard, a smart media, a payroll card, a health care card, a wrist band, a machine readable medium containing account information, a keychain payment device such as the SPEEDPASS® payment device which is commercially available from ExxonMobil Corporation, or a supermarket discount card, a cellular phone, personal digital assistant, a pager, a security card, a computer, an access card, a wireless terminal, or a transponder, for example. The portable consumer device 512 may include a volatile or a non-volatile memory to store information such as the account number or a name of the account holder.

The merchant 510 may use an acceptance point device, such as a POS terminal, to obtain account information, such as the account identifier, from the portable consumer device 512. The portable consumer device 512 may interface with the POS terminal using a mechanism including any suitable electrical, magnetic, or optical interfacing system such as a contactless system using radio frequency, a magnetic field recognition system, or a contact system such as a magnetic stripe reader. The POS terminal sends the authorization request to the issuer 504 of the portable consumer device 512.

Alternatively, or in combination, the portable consumer device 512 may communicate with the issuer 504, the transaction handler 506, or the acquirer 508.

The issuer 504 may submit the authorization response for the transaction via the transaction handler 506. Authorization includes the issuer 504, or the transaction handler 506 on behalf of the issuer 504, authorizing the transaction in connection with instructions of the issuer 504, such as through the use of business rules. The transaction handler 506 may maintain a log or history of authorized transactions. Once approved, the merchant 510 can record the authorization and allow the consumer 502 to receive the good or service.

The merchant 510 may, at discrete periods, such as the end of the day, submit a list of authorized transactions to the acquirer 508 or other components of the payment processing system 500 for clearing and settling. The transaction handler 506 may compare the submitted authorized transaction list with its own log of authorized transactions. If a match is found, the transaction handler 506 may route the clearing and settling request from the corresponding acquirer 508 to the corresponding issuer 504 involved in each transaction. Once the acquirer 508 receives the payment of the transaction from the issuer 504, it can forward the payment to the merchant 510 less any transaction costs, such as fees. If the transaction involves a debit or pre-paid card, the acquirer 508 may choose not to wait for the initial payment prior to paying the merchant 510.

There may be intermittent steps in the foregoing process, some of which may occur simultaneously. For example, the acquirer 508 can initiate the clearing and settling process, which can result in payment to the acquirer 508 for the amount of the transaction. Alternatively, or in combination, the acquirer 508 may request from the transaction handler 506 that the transaction be cleared and settled.

It should be understood implementations can be in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. In a payment processing system that includes a transaction handler module processing a plurality of transactions each characterized by a merchant and a consumer engaging in the transaction for a good or a service upon an account that an issuer has issued to the consumer, wherein the merchant submits the transaction to an acquirer for processing by the transaction handler who requests the issuer to obtain payment for the transaction from the account, and wherein the issuer forwards the payment to the transaction handler who forwards the payment to the acquirer to pay the merchant for the transaction, for each said transaction, comprising a computer usable medium having a computer readable program code embodied therein, said computer readable program code adapted to execute a computer implemented method comprising:
  receiving an authorization request having:
    a preliminary quantity of funds to be authorized by the issuer;
    a code for the transaction that is unique among a plurality of said transactions of one said merchant; and
    an account identifier of the account;
  associating, with the transaction, a Globally Unique IDentifier ("GUID") that is unique within the payment processing system such that the GUID associated with the transaction is unique among multiple said GUIDs each associated with one said transaction among multiple said transactions of multiple said merchants;
  using an algorithm to derive a plurality of said GUIDs, each associated with a corresponding respective said transaction, wherein each said GUID of the plurality of said GUIDs is derived without having a corresponding said account identifier of the account as an input to the algorithm;
  forming a first transmission having information for delivery to the issuer and usable to form an authorization response responding to the authorization request, wherein the information includes the GUID;
  receiving the authorization response of the issuer, wherein the authorization response includes the GUID but does not include the account identifier;
  associating the authorization response with the authorization request by, at least, matching the GUID associated with the transaction with the GUID received in the authorization response;
  forming a second transmission containing information for delivery to the merchant, wherein the information does not include the account identifier but includes:
    the authorization response;
    the GUID; and
    the code for the transaction;
  receiving a third transmission that includes:
    the GUID; and
    a final quantity of funds for the transaction;
  and
  forming a fourth transmission having information for delivery to the issuer and usable to forward the final quantity of funds for the transaction from the account to pay the merchant for the transaction, wherein the fourth transmission does not include the account identifier.

2. The computer implemented method as defined in claim 1, further comprising calculating a fee associated with processing the transaction that is subtracted from the final quantity of funds prior to the merchant being paid for the transaction.

3. The computer implemented method as defined in claim 1, further comprising receiving a fifth transmission includes a request for clearing and settling the transaction so that the final quantity of funds can be forwarded to the merchant.

4. The computer implemented method as defined in claim 3, wherein the fifth transmission includes the GUID but not the account identifier.

5. The computer implemented method as defined in claim 1, further comprising converting foreign currency into a domestic currency value using a single exchange rate to convert each of:
  the preliminary quantity of funds to be authorized for the transaction by the issuer; and
  the final quantity of funds, wherein both the preliminary quantity of funds and the final quantity of funds are in foreign currency.

6. The computer implemented method as defined in claim 1, further comprising forming a fifth transmission includes the GUID and a request to refund the final quantity of funds from the merchant back to the account.

7. The computer implemented method as defined in claim 1, further comprising receiving a fifth transmission addressed to a sponsor of a loyalty program and including the GUID and a request that the sponsor transfer money equal to a value of an incentive given to the consumer whose said transaction satisfies a criterion of the loyalty program.

8. The computer implemented method as defined in claim 1, wherein the preliminary quantity of funds to be authorized is selected from the group consisting of:
  a value matching the final quantity of funds;
  a nominal value to test whether the account is valid within the payment processing system; and
  an estimate of the final quantity of funds, wherein the estimate is determined by the merchant.

9. The computer implemented method as defined in claim 1, wherein the account is selected from the group consisting of:
  a credit account;
  a prepaid account;
  a debit account;
  a line of credit account;
  a deposit account;
  a loan account;
  a flexible spending account; and
  a health savings account.

10. Any payment processing system, comprising a computer usable medium having a computer readable program code embodied therein, in which a merchant and a consumer engage in a transaction, a payment quantity of the transaction being unknown when the transaction is authorized by an authorization, the authorization being received by the merchant from an issuer as being payable upon an account issued to the consumer by the issuer, the account being associated with an account identifier, wherein the merchant submits the payment amount of the transaction to the payment processing system with a Globally Unique IDentifier ("GUID") that identifies:
  the transaction from other said transactions within the payment processing system; and
  neither the account nor its associated account identifier.

11. The payment processing system as defined in claim 10, wherein the merchant is selected from the group consisting of:
  a hotel operator;
  a motor vehicle gasoline provider;
  a vehicle rental provider;
  a restaurant operator; and
  a combination thereof.

12. The payment processing system as defined in claim 10, wherein the transaction is authorized by the issuer for a quantity of funds selected from the group consisting of:
  a value matching the payment amount;
  a nominal value to test whether the account is valid within the payment processing system; and
  an estimate of the payment amount.

13. The payment processing system as defined in claim 10, further comprising a transaction handler processing a plurality of said transactions each characterized by one said merchant and one said consumer engaging in one said transaction for a good or service upon a corresponding account, wherein the one said merchant submits the one said transaction to a corresponding acquirer for processing by the transaction handler who requests the corresponding issuer to obtain the payment amount for the one said transaction from the corresponding account, and the corresponding issuer forwards the payment to the transaction handler who forwards the payment to the corresponding acquirer to pay the one said merchant for the one said transaction.

14. In a payment processing system that includes a transaction handler module processing a plurality of transactions each characterized by a merchant and a consumer engaging in the transaction for a good or a service upon an account that an issuer has issued to the consumer, wherein the merchant submits the transaction to an acquirer for processing by the transaction handler who requests the issuer to obtain payment for the transaction from the account, and wherein the issuer forwards the payment to the transaction handler who forwards the payment to the acquirer to pay the merchant for the transaction, for each said transaction, comprising a computer usable medium having a computer readable program code embodied therein, said computer readable program code adapted to execute a computer implemented method comprising:
  forming an authorization request having:
    a preliminary quantity of funds to be authorized for the transaction by the issuer;
    a code for the transaction that is unique among a plurality of said transactions of one said merchant; and
    an account identifier of the account;
  receiving an authorization response of the issuer responding to the authorization request and not including the account identifier but including:
    the code for the transaction; and
    a Globally Unique IDentifier ("GUID"), wherein the GUID is unique within the payment processing system such that the GUID associated with the transaction is unique among multiple said GUIDs each associated with one said transaction among multiple said transactions of multiple said merchants, wherein the multiple said GUIDs are derived using an algorithm without having a corresponding said account identifier of the account as an input to the algorithm;
  associating the GUID received in the authorization response with the transaction by, at least, matching the code for the transaction in the authorization request with the code for the transaction received in the authorization response;
  and
  when the response includes an indication that the transaction has been authorized:
    releasing the good or the service to the consumer; and
    forming a transmission including:
      the GUID; and
      a final quantity of funds for the transaction that is to be the payment for the transaction from the account, wherein the transmission does not include the account identifier;
  and
    receiving a notification that the payment amount from the account has been forwarded to the acquirer.

15. The computer implemented method as defined in claim 14, further comprising batching a set of said transactions each:
- having been authorized by a corresponding said issuer; and
- having a corresponding GUID, wherein the transmission includes the batched set of said transactions.

16. The computer implemented method as defined in claim 14, further comprising forming a second transmission requesting that the transaction that has been authorized be cleared and settled.

17. The computer implemented method as defined in claim 14, wherein the preliminary quantity of funds to be authorized is selected from the group consisting of:
- a value matching the final quantity of funds;
- a nominal value to test whether the account is valid within the payment processing system; and
- an estimate of the final quantity of funds, wherein the estimate is determined by the merchant.

18. The computer implemented method as defined in claim 14, further comprising forming a second transmission including the GUID and a request to refund the final quantity of funds from the merchant back to the account.

19. The computer implemented method as defined in claim 14, further comprising forming a second transmission addressed to the transaction handler including the GUID and a request that money be transferred to the issuer in an amount equal to a value of a credit given, by the issuer, to the consumer whose said transaction satisfies a criterion of a loyalty program.

20. The payment processing system of claim 10, wherein the GUID in a plurality of said GUIDs, each associated with a corresponding respective said transaction, is derived using an algorithm without having a corresponding said account identifier of the account as an input to the algorithm.

21. The payment processing system of claim 20, wherein the algorithm used to derive the GUID includes having a merchant identifier, parameter of the transaction, geographical indicator of the merchant, random or sequential identifier, or combinations thereof, as an input to the algorithm.

22. The computer implemented method as defined in claim 1, wherein the algorithm used to derive the GUID includes having a merchant identifier, parameter of the transaction, geographical indicator of the merchant, random or sequential identifier, or combinations thereof, as an input to the algorithm.

23. The computer implemented method as defined in claim 14, wherein the algorithm used to derive the GUID includes having a merchant identifier, parameter of the transaction, geographical indicator of the merchant, random or sequential identifier, or combinations thereof, as an input to the algorithm.

24. The computer implemented method as defined in claim 1 wherein the third transmission includes a remittance request from the merchant.

25. The computer implemented method as defined in claim 23 wherein the remittance request is formed in a separate transmission including the GUID, wherein the transaction handler module utilizes the GUID to match the remittance request with the code for the transaction.

* * * * *